United States Patent
Kuehneweg et al.

(10) Patent No.: US 9,732,252 B2
(45) Date of Patent: Aug. 15, 2017

(54) POLYURETHANE-BASED PROTECTIVE COATINGS FOR ROTOR BLADES

(75) Inventors: Bernd Kuehneweg, Düsseldorf (DE); Björn Weber, Köln (DE); Timothy N. Narum, Lake Elmo, MN (US); Stuart E. Fores, Darlington (GB); Ian Robinson, Northallerton (GB); Eva Maria Roggentin, Düsseldorf (DE); Guido Hitschmann, Neuss (DE); Rainer Kurz, Neuss (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 200 days.

(21) Appl. No.: 14/400,822

(22) PCT Filed: May 15, 2012

(86) PCT No.: PCT/US2012/037979
§ 371 (c)(1),
(2), (4) Date: Feb. 27, 2015

(87) PCT Pub. No.: WO2013/172823
PCT Pub. Date: Nov. 21, 2013

(65) Prior Publication Data
US 2015/0166831 A1 Jun. 18, 2015

(51) Int. Cl.
| | | |
|---|---|---|
| *C09D 175/08* | (2006.01) | |
| *B05B 13/00* | (2006.01) | |
| *F01D 5/28* | (2006.01) | |
| *B05D 3/00* | (2006.01) | |
| *B64C 11/20* | (2006.01) | |
| *B64C 27/473* | (2006.01) | |
| *C08G 18/48* | (2006.01) | |
| *C08G 18/66* | (2006.01) | |
| *C08G 18/73* | (2006.01) | |
| *C08G 18/10* | (2006.01) | |

(52) U.S. Cl.
CPC ............ *C09D 175/08* (2013.01); *B05B 13/00* (2013.01); *B05D 3/007* (2013.01); *B64C 11/205* (2013.01); *B64C 27/473* (2013.01); *C08G 18/10* (2013.01); *C08G 18/4854* (2013.01); *C08G 18/6674* (2013.01); *C08G 18/73* (2013.01); *F01D 5/288* (2013.01); *F05D 2240/304* (2013.01); *F05D 2300/43* (2013.01); *Y10T 428/31551* (2015.04)

(58) Field of Classification Search
CPC ............ C08G 18/10; C08G 18/4854; C08G 18/6674; C08G 18/73; C09D 175/08; B05B 13/00; B05D 3/007; B64C 11/205; B64C 27/473; F01D 5/288; F05D 2240/304; F05D 2300/43; Y10T 428/31551
USPC ........................ 428/423.1; 528/65; 416/241
See application file for complete search history.

(56) References Cited

U.S. PATENT DOCUMENTS

| | | | |
|---|---|---|---|
| 4,110,317 A | 8/1978 | Moraveck | |
| 4,513,112 A | 4/1985 | Ernst | |
| 6,130,285 A | 10/2000 | Melchiors | |
| 6,187,444 B1 | 2/2001 | Bowles, III | |
| 6,221,999 B1 | 4/2001 | Peter | |
| 2002/0161123 A1 | 10/2002 | Li | |
| 2004/0198852 A1* | 10/2004 | Lin | ........................ C08G 18/10 521/54 |
| 2005/0137375 A1 | 6/2005 | Hansen | |
| 2005/0222363 A1 | 10/2005 | Krebs | |

(Continued)

FOREIGN PATENT DOCUMENTS

| | | |
|---|---|---|
| CA | 962393 | 2/1975 |
| DE | 2001-032791 | 5/2001 |

(Continued)

OTHER PUBLICATIONS

International Search Report for PCT International Application No. PCT/US12/37979 Oct. 26, 2012, 5 pages.

(Continued)

*Primary Examiner* — Thao T Tran
(74) *Attorney, Agent, or Firm* — Carlos M. Téllez; 3M Innovative Properties Company

(57) ABSTRACT

Provided are reactive compositions for making a polyurethane-based rain-erosion protective coating for rotor blades, the reactive composition comprising an isocyanate-reactive component and an isocyanate-functional component and wherein the isocyanate-reactive component comprises a first component i) being a short chain hydroxyl-functional compound having two terminal (α-ω) hydroxyl groups, a molecular weight of less than 250 g/mole and containing at least 2 carbon atoms and a second component ii) comprising a high molecular weight hydroxyl-functional compound having two terminal (α-ω) hydroxyl groups and a molecular weight of at least 250 g/mol and comprising one or more units selected from oxyalkylene units and polyoxyalkylene units and wherein the isocyanate-functional component is an isocyanate prepolymer of the general formula NCO—Z—NCO, wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof. Also provided are protective coatings obtained from the reactive compositions and methods of applying the coatings to articles.

9 Claims, No Drawings

(56) References Cited

U.S. PATENT DOCUMENTS

| | | | |
|---|---|---|---|
| 2005/0271881 A1* | 12/2005 | Hong | B82Y 30/00 |
| | | | 428/423.1 |
| 2006/0058453 A1 | 3/2006 | Argyropoulos | |
| 2007/0149749 A1 | 6/2007 | Rukavina | |
| 2007/0155935 A1 | 7/2007 | Rukavina | |
| 2007/0155936 A1 | 7/2007 | Rukavina | |
| 2008/0096995 A1 | 4/2008 | Bedri | |
| 2008/0159870 A1* | 7/2008 | Hong | B23P 6/007 |
| | | | 416/224 |
| 2008/0214727 A1 | 9/2008 | Pohl | |
| 2010/0068446 A1* | 3/2010 | McGuire | B32B 27/08 |
| | | | 428/76 |
| 2010/0255279 A1 | 10/2010 | Hong | |
| 2011/0078832 A1 | 3/2011 | Kocher | |

FOREIGN PATENT DOCUMENTS

| | | |
|---|---|---|
| WO | WO 01-32791 | 5/2001 |
| WO | WO 2005-030825 | 4/2005 |
| WO | WO 2005-030893 | 4/2005 |
| WO | WO 2010-122157 | 10/2010 |
| WO | WO 2012-006207 | 1/2012 |
| WO | WO 2013-032113 | 3/2012 |

OTHER PUBLICATIONS

Supplementary European Search Report for EP 12 87 6989 dated Feb. 16, 2016.

* cited by examiner

POLYURETHANE-BASED PROTECTIVE COATINGS FOR ROTOR BLADES

CROSS REFERENCE TO RELATED APPLICATIONS

This application is a national stage filing under 35 U.S.C. 371 of International Application NO. PCT/US2012/037979, filed 15 May 2012, the disclosure of which is incorporated by reference in its entirety herein.

FIELD

The present invention relates generally to polyurethane-based coatings, in particular to anti-erosion coatings for rotor blades, to methods of protecting rotor blades from erosion and to rotor blades containing the coatings.

BACKGROUND ART

Rotor blades, e.g. helicopter rotors, rotor blades of wind turbines and the like, are subject to erosion caused by the impact of airborne material, such as rain, sand, and dust. Of all parts of the rotor blades their leading edges are in particular prone to damage by erosion. The industry has sought means of protection against such erosion. For example, protective tapes or films may be applied to the leading edges of rotor blades. However, the application of tapes or films on rotor blades cannot be easily automated and is usually done by hand. This process can be time-consuming, in particular for applying films to rotor blades of great dimensions, as may be the case for rotor blades in wind turbines, in particular wind turbines for off-shore power stations. Such rotor blades may have a length of greater than 30 m or even greater than 60 m. Even rotor blades with a length of more than 100 m are currently contemplated.

Moreover, films have comparatively distinct edges which may negatively impact on the aerodynamic properties of the rotor blades.

Therefore, alternatives to protective films have been proposed.

An approach has been described, for example, in WO2010/122157 where a specific polyurethane protective coating based on polyesterpolyols is applied as the outermost layer on the rotor blade. The exemplified compositions provided in WO2010/122157 have been shown to be effective in a rain erosion test but contain considerable amounts of solvents (between 19 and 31% by weight), which is disadvantageous from an environmental point of view.

It has now been found that polyurethane based coatings of specific polyols and isocyanates can provide good protection against erosion, in particular rain erosion.

SUMMARY

In the following there is provided a reactive composition for making a polyurethane-based rain-erosion protective coating for rotor blades, the reactive composition comprising an isocyanate-reactive component and an isocyanate-functional component and wherein the isocyanate-reactive component comprises
a first component i) being a short chain hydroxyl-functional compound having two terminal ($\alpha$-$\omega$) hydroxyl groups, a molecular weight of less than 250 g/mole and containing at least 2 carbon atoms and
a second component ii) comprising a high molecular weight hydroxyl-functional compound having two terminal ($\alpha$-$\omega$) hydroxyl groups and a molecular weight of at least 250 g/mol and comprising one or more units selected from oxyalkylene units and polyoxyalkylene units and
wherein the isocyanate-functional component is an isocyanate prepolymer of the general formula NCO—Z—NCO, wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof.

In another aspect there is provided a rain-erosion protective coating on the external surface of a rotor blade, wherein the coating comprises the reaction product of a reactive composition comprising an isocyanate-reactive component and an isocyanate-functional component and wherein the isocyanate-reactive component comprises
a first component i) being a short chain hydroxyl-functional compound having two terminal ($\alpha$-$\omega$) hydroxyl groups having a molecular weight of less than 250 g/mole and having at least 2 carbon atoms, and
a second component ii) comprising a high molecular weight hydroxyl-functional compound having two terminal ($\alpha$-$\omega$) hydroxyl groups and a molecular weight of at least 250 g/mol and comprising one or more units selected from oxyalkylene units and polyoxyalkylene units,
and wherein the isocyanate-functional component is an isocyanate prepolymer of the general formula NCO—Z—NCO, wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof.

In yet another aspect there is provided a method for protecting the external surface of a rotor blade from erosion comprising applying the reactive composition of claim 1 to the external surface of a rotor blade and subjecting the reactive composition to curing.

In a further aspect there is provided a method for applying a reactive composition for making protective coatings to a curved surface of an article comprising applying the composition on the surface using a structured sheet wherein the sheet is structured to provide a continuous path through which the composition can be distributed onto the surface and wherein the sheet is bent around the curved surface and moved along the curved surface.

In yet another aspect there is provided a device for applying a coatable substance onto a curved surface the device comprising a structured sheet wherein the sheet is structured to provide a continuous path through which the coatable substance can be distributed onto the surface and wherein the sheet is bent to fit around the curved surface to be coated and wherein the curved surface is a rotor blade.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The coatings provided by the present disclosure can be used to protect articles, in particular rotor blades, or more particular the leading edge of rotor blades, from erosion, in particular rain erosion.

Typically, the coatings of the present disclosure are polyurethane-based. They are prepared from a precursor composition. The precursor composition is a reactive composition and typically contains an isocyanate-reactive component and an isocyanate-functional component. These components react with each other (cure) to form the coating composition (the cured composition). The precursor composition typically is a two-component (2K) composition. This means the compositions comprising the reactive components (the composition comprising the isocyanate-reactive component on the one hand and the composition comprising the isocyanate-functional component on the other hand) are kept separated from each other and are only combined to form a coating precursor composition prior to their application onto the substrate to be coated. The coating compositions provided herein thus comprise or are the reaction product of the reaction of the isocyanate-reactive component with the isocyanate-functional component. Suitable isocyanate-reactive components and suitable isocyanate-functional components will be described in greater detail below.

It has been found by the present inventors that in order to increase the effectiveness as an anti-erosion coating, the polyurethane-based coatings preferably have a combination of mechanical properties, in particular if they are meant to be effective at a low thickness, for example having a thickness of from about 150 up to about 700 μm. Low thickness may be desired for economical reasons and also aerodynamic reasons. The inventors realized that good rain erosion properties may be achieved by polyurethane-based coatings when the coating is highly elastic, for example having an elongation at break of at least about 400%. Preferably, the coatings have an elongation at break of at least about 500% and typically of at least about 600%. Without wishing to be bound by theory it is believed that high elasticity of the protective material dampens the impact of rain droplets hitting the blade.

Next to the high elasticity the coating favorably has a substantial non-elastic component and a sufficient tensile strength to counter-balance the highly elastic behavior. It is believed that otherwise the protection gained by the increased elasticity may be lost again by a too elastic material having insufficient resilience. In this case particles or rain drops may make an impact on the surface to be protected if the material is only elastic and does not offer sufficient resilience. The coatings favorably have a tensile strength of at least about 20 MPa, for example from about 31 MPa to about 65 MPa.

The coatings desirably have a considerable non-elastic component. This means they do not retain their original strength after having been stretched (for example to 300% of their original length). The non-elastic component may be determined by the permanent set E. Suitable coatings have a permanent set of E from about 15% to about 60%, preferably from about 24% to about 45%. This means after the elongation to 300% followed by complete relaxation, the material does not retain its original length but has a length that is from about 15% to about 60%, preferably from about 24 to about 45% greater than its original length. Such permanent set E is similar to that observed in effective commercial erosion protection tapes (e.g. protection tape W8067 from 3M Company).

The above described mechanical properties of the coatings can be achieved by selecting the reactive components of the coating precursor compositions and adjusting their relative amounts.

The following components of the coatings and its precursor composition are provided herein as guidance to prepare precursor compositions that will cure to coating compositions having the desired mechanical properties described above. However, it may be possible to use other combinations to provide coatings with the same properties.

Isocyanate-Reactive Component

The isocyanate-reactive component typically contains a combination of several isocyanate-reactive materials. As understood by one of ordinary skill in the art, an isocyanate-reactive material includes at least one active hydrogen. Those of ordinary skill in the polyurethane chemistry art will understand that a wide variety of materials are suitable for this component. For example, amines, thiols, and polyols are isocyanate-reactive materials. However, it is preferred that the isocyanate-reactive material be a hydroxyl-functional material. Polyols are the preferred hydroxyl-functional material used in the present disclosure. Polyols provide urethane linkages when reacted with an isocyanate-functional component, such as a polyisocyanate.

Suitable isocyanate-reactive materials to prepare the coatings according to the present disclosure comprise a combination of a short chain hydroxyl-functional compound, typically an -hydroxyl compound (i.e. a compound comprising two terminal hydroxyl groups) and a high molecular weight hydroxyl functional compound, typically a compound comprising two terminal (-hydroxyl groups and further comprising one or more oxyalkylene or polyoxyalkylene units.

Short Chain Hydroxyl-Functional Materials

Preferably, the short chain hydroxyl-functional materials are compounds having two terminal ($\alpha$-$\omega$) hydroxyl groups. Typically the material has a molecular weight of less than 250 g/mole, preferably less than about 220 g/mole. Such material includes dihydroxyl-compounds having a carbon chain of from 2 to 12 carbon atoms, preferably from 3 to 10 and more preferably from 4 to 8 carbon atoms. In some embodiments the carbon chain may be interrupted by one or more single oxygen atoms, while in other embodiments the carbon chain may not be interrupted. The latter embodiment is preferred. Preferably the short chain hydroxyl-functional material may be linear, cyclic or branched, although linear materials are preferred. The hydroxyl functional material includes compounds may be selected from alkane diols, alkane ether diols, alkane polyether diols and alkane ester diols containing from about 2 to 12, preferably 3 to 12 carbon atoms. Such compounds are preferably $\alpha$-$\omega$ diols. Preferably the diols are linear $\alpha$-$\omega$ diols, i.e. diols where the hydroxyl functions are at the terminal positions of the molecule. Typical examples of short chain $\alpha$-$\omega$ diols include but are not limited to 1,2-ethanediol, 1,3-propanediol, 1,4-butanediol, 1,5-pentane-diol, 1,6-hexanediol, 1,7-heptane-diol, 1,8-octanediol and combinations thereof.

The isocyanate-reactive component may typically contain from about 20 to 40 ppw (parts per weight) of the short chain hydroxyl-functional materials (based on 100 parts of the high molecular weight hydroxyl-functional component).

High Molecular Weight Hydroxyl-Functional Material

The high molecular weight hydroxyl-functional material has a molecular weight of from at least 250 g/mole. Typically, the high molecular weight hydroxyl-functional material has a molecular weight of from about 250 to about 10,000 g/mole, preferably from at least 250 g/mole up to about 2,500 g/mole. Preferably, the high molecular weight materials are polyols, more preferably diols, most preferably α-ω diols and more particularly α-ω diols comprising one or more units selected from oxyalkylenes or polyoxyalkylenes. The high molecular weight hydroxyl-functional materials are preferably aliphatic and may be branched, cyclic or linear. Examples of high molecular weight hydroxyl-functional material include but are not limited to alkylene oxide diols (also referred to as oxyalkylene diols or ether diols) like diols containing an alkylene oxide unit selected from ethylene oxide, propylene oxide and butyleneoxide to name just a few. Other examples include polyether diols (also referred to as polyoxyalkylene diols) e.g. diols containing one or more polyoxyalkylene units, including but not limited to propylene oxide units, polyethylene oxide units, polyoxytetramethylenes and combinations thereof.

The high molecular weight hydroxyl-functional material may be a blend of several compounds, in which case the molecular weight ranges may be average molecular weight ranges, typically weight averaged molecular weight ranges.

In a preferred embodiment the high molecular weight material may comprises at least two populations of hydroxyl-functional materials of different molecular weight, for example it may comprise a combination of at least two molecular weight fractions. Such compositions having several distinct populations are referred to in the art as multimodal compositions. In a first fraction (fraction iia) the high molecular weight material may have a molecular weight within the range of from at least 250 g/mole to about 590 g/mole. The second fraction (fraction iib) may comprise high molecular weight material in the range of from about 600 g/mole to about 10,000, typically from about 700 g/mole to about 5,000 g/mole or from about 800 g/mole to about 3,000 g/mole. The material of the fractions may be the same or different chemical composition. Preferably, both fractions iia) and iib) contain α-ω polyols, preferably diols, comprising one or more units selected from oxyalkylenes and polyaxyalkylenes as described above.

Typically, the fraction iia) may be present in an amount of up to one third, typically up to one fourth of that of fraction iib). Such amounts are based on weight.

It is understood that the multimodal high molecular weight material illustrated above may be bimodal but may also comprise other distinct populations of isocyanate-reactive materials, i.e. the multimodal compositions may or may not be at least trimodal or polymodal compositions of hydroxyl-functional material.

The isocyanate-reactive component may typically contain from about 20 to 40 ppw (parts per weight) of the short chain hydroxyl-functional materials (based on 100 parts of the high molecular weight hydroxyl-functional component).

In some embodiments the isocyanate-reactive component may contain from about 20 to 40 ppw of the short chain hydroxyl functional material, and the high molecular weight material comprises the fractions iia) and iib) described above and comprises from about 10 to 34 ppw, preferably 15 to 25 ppw of the medium weight molecular weight hydroxyl-functional materials according to fraction iia) based on 100 parts by weight of the high molecular weight hydroxyl-functional component according to fraction iib).

It is also understood that the hydroxyl-functional material may be present as blends or mixtures of diols. In case of such mixtures or blends of materials the molecular weight ranges may be average molecular weight ranges, for example number averaged molecular weight ranges or weight averaged molecular weight ranges, the latter being typically applied. In case of blends or mixtures of materials it is also understood that the diols provided may contain fractions of higher or lower alcohols. The OH— functionality of the high molecular weight hydroxyl-functional material may be an average value or may be a range for example, the OH functionality may be within the range of about 1.8 to about 2.2.

The isocyanate-reactive material may typically have a reactive group equivalent (typically OH equivalent) of about 2 to about 6 mol per 1000 g of isocyanate-reactive material.

It is understood that in addition to the compounds described above other hydroxyl-functionalized compounds, like for example polyols, i.e. hydroxyl-functionalized materials having a hydroxyl functionality of greater than 2 hydroxyl groups per molecule may be used although their presence is not necessary to achieve the desired rheological properties and performance as erosion protective coating.

It is also understood that in addition to the hydroxyl-functionalized material described in greater detail above other isocyanate-reactive components may be present, for example amine-functionalized materials which would form ureaurethane units. The term polyurethane-based as used herein is meant to include the presence of other units including polymeric units other than urethane-units. However, the reactive composition should predominantly contain the hydroxyl-functionalized material described in detail above (e.g. at least 50% or at least 60% or at least 75% or at least 90% or at least 95% by weight of the isocyanate-reactive material in the reactive composition should be made up of the hydroxyl-functionalized material described in greater detail above).

Isocyanate-Functional Component

The isocyanate-reactive component is reacted with the isocyanate-functional component during the formation of the polyurethane-based coatings of the invention.

The isocyanate-functional component may contain one isocyanate-functional material or mixtures thereof. The isocyanate material comprises a polyisocyanate. Polyisocyanates have at least two isocyanate-functional groups, typically at the terminal position of the molecule. They provide urethane linkages when reacted with the hydroxyl groups of the hydroxy-functional isocyanate-reactive components.

The polyisocyanates are typically diisocyanates or comprise diisocyanates. The polyisocyanates are generally oligomeric isocyanates. Such oligomeric isocyanate-functional components are referred to in the art as "prepolymers". They may be obtained by the reaction of "diisocyanates" with isocyanate-reactive compounds. The isocyanate-reactive compounds contain reactive hydrogens that react with the isocyanate group of the isocyanate compound to form a link between isocyanate and isocyanate-reactive compound. Such reactive hydrogens are provided by functional groups like, for example, hydroxyl groups, ester groups and amino groups. The isocyanate-reactive compounds are typically bifunctional, preferably linear bifunctional compounds and include, for example, diols, diamines, diesters, hydroxyl esters and amino esters. The carbohydrate chain linking the functional groups may be interrupted by one or more oxygen atoms. For example, suitable diols include diol ethers or diol polyethers and suitable esters may include oxyalkylene esters or polyoxyalkylene esters. Typically the isocyanate-reactive compounds have from 2 to 20, preferably 4 to 14, more preferably 6 to 12 carbon atoms, which may or may not be interrupted by one or more oxygen atoms. Alkane diols, alkane diol ethers and alkane diol polyethers are the preferred isocyanate-reactive compounds.

The diisocyanates are used in molar excess over the isocyanate-reactive compounds to ensure that the resulting oligomer (prepolymer) has terminal isocyanate groups. The prepolymers preferably include one or more urethane linkages, i.e. the prepolymer can be obtained by the reaction of one or more polyisocyanates (typically diisocyanates) and a hydroxyl component (typically a diol). Preferably, the polyisocyanate prepolymer contains at least two urethane units. The at least two urethane units preferably are the reaction product of a linear aliphatic diisocyanate and an isocyanate-reactive compound.

The isocyanate-reactive compounds typically are diisocyanates, preferably aliphatic diisocyanates. Suitable aliphatic diisocyanates are preferably linear and include diisocyanates having from 3 to 20 carbon atoms, and more preferably from 6 to 12 carbon atoms, like for example but not limited to hexamethylene diisocyanate, heptamethylene diisocyanate, octamethylene diisocyanate, nonamethylene diisocyanate. That is, the polyisocyanate prepolymer is obtainable by a reaction of one or more (preferably linear) diisocyanates as described above with one or more preferably linear isocyanate-reactive compounds as described above. For example, preferred substantially linear polyisocyanate prepolymers include isocyanate terminated reaction products obtainable by the reaction of linear diisocyanates having from 3 to 20 carbon atoms with linear diols, diol ether or diol polyethers having from 3 to 20 carbon atoms. The resulting prepolymers are substantially linear. For example, the prepolymers may be represented by the general formula

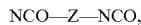

NCO—Z—NCO, wherein Z is a linking group comprising at least two urethane (—NH—CO—O—) units and additionally one or more, preferably repeating, units selected from alkylenes, oxyalkylenes, polyoxyalkylenes, alkylene esters, oxyalkylene esters, polyoxyalkylene esters and combinations thereof.

Typically, the polyisocyanate prepolymers have a molecular weight of from about 600 to about 4,000 g/mole, preferably from about 800 to 2,000 g/mole. Preferably the prepolymer has an equivalent weight of from about 200 to about 600. The isocyanate-functional material may typically have an isocyanate equivalent (NCO equivalent) of 2 to 4 mol per 1000 g of isocyanate-functional material.

Typically, the prepolymer has a viscosity from about 1500 up to about 10,000, preferably up to about 8,000 mPa·s at 25° C. (DIN EN ISO 3219/A.3).

Typical examples of useful prepolymers are commercially available, for example form Bayer MaterialScience LLC under the trade designation DESMODUR and MONDUR and the PAPI series from Dow Plastics, a business group of the Dow Chemical Company.

Additives:

The isocyanate-reactive component and/or the isocyanate-functional component may comprise further ingredients to modify the resulting coating or, for example, to influence the curing time and pot life of the reactive compositions. Typical additives include but are not limited to fillers, pigments, stabilizors, catalysts, pot life-enhancing agents, dehumidifiers etc.

Typical examples of fillers include inorganic particles including but not limited to silica, such as fumed silica, glass or ceramic beads/bubbles, fibers (e. g., glass, metal, inorganic, or organic fibers). Fillers may be used in low amounts and generally may not exceed 10% or 5% by weight based on the total weight of the reactive composition or coating.

Other typical additives include pigments. Preferably the amount of pigments is less than 20% by weight of the reactive composition or coating. In some embodiments the compositions are essentially free of pigments. Essentially free means the composition contain no pigments or in amounts that still lead to a transparent coating (e.g. amounts of less than 1% by weight based on the weight of the reactive composition/coating). Such coatings are typically transparent. This may be advantageous because rotor blades, in particular those of great dimensions contain warning colors, typically a pattern of red and white. The protective coating is typically applied as the outermost coating and a transparent coating may thus not interfere with the warning colors on the blade.

Pigments are typically metal oxides or carbon particles and include, for example, black pigments like carbon particles (including but not limited to carbon black, acetylene black, ketchen black, soot, carbon nanotubes), white pigments (including but not limited to zink oxides, titanium oxides), red pigments (including but not limited to iron oxides, lead oxides).

Further suitable additives include UV stabilizers to prevent yellowing of the materials. Preferred compounds are sterically hindered amines. Such amines are not reactive with the isocyanate-functional component. Such sterically hindered and inert amines are known in the art as HALS. Typical examples of HALS are described for example in US 2002/0161123 A1 to Li et al. HALS are commercially available, for example under the trade designation TINUVIN from Ciba Speciality Chemicals, Switzerland. UV stabilizers may be added typically in amounts of up to about 20% by weight based on reactive composition/coating.

The reactive compositions may contain catalysts to accelerate the curing reaction. Catalysts for the polymerization reaction between the reactive components may be included in the compositions as known in the art for preparing polyurethanes. Typical examples include lead, tin and zirconium compounds (other than pigments). Typical amounts of catalysts include up to 1% by weight based on the total precursor composition (i.e. the combined reactive components) or the coating composition. To increase the pot life so-called pot life enhancers may be added. These include compounds complexing agents that form weak and reversible complexes with the catalysts. The weak complex between pot-life enhancer and catalyst may be broken up by oxygen or water molecules airborne humidity. This way the pot-life is increased because the curing reaction is slowed down until the weak complex between catalyst and pot-life enhancer is broken up by ambient oxygen or humidity. Pot-life enhancers include but are not limited to carboxylic acids or acetylated ketones, like acetylacetone.

Other typical additives include dehumidifiers (e.g. but not limited to molecular sieves), antimicrobial agents, flame retardants etc.

The reactive compositions may be prepared without requiring solvents. Therefore, the reactive composition and coatings may be 100% solid compositions or essentially solvent-free composition. Solvents are typically carbohydrates or functional carbohydrates (other than those mentioned above) that have a melting point below 15° C. and a boiling point of less than 120° C. Examples include aromatic like toluene or xylene; ketones like cyclohexanone, methyl ethyl ketone, methyl isobutyl ketone, diacetone alcohol; alcohols like ethanol, methanol, propanol; esters like methoxy propyl acetates, butyl acetates, ethylacetates. Essentially free means the compositions contain no or less than 5% by weight, preferably less than 1% by weight based on the total compositions of solvents.

The reactive compositions provided herein are curable at room temperature. The term curable as used herein means that the material can polymerize. It is not required that cross-linking occurs. In fact the cured composition may contain exclusively or predominantly linear polymers. The compositions typically have a pot time of greater than 1 minute and typically less than 10 minutes. The pot time is the time at which the compositions remain coatable or pourable after being combined. The compositions are curable at room temperature, which means the polymerization of the reactive components starts at room temperature but curing may be accelerated at elevated temperatures.

Preparation of Compositions Comprising the Isocyanate-Functional Component

In general the additives may be added to the isocyanate-functional materials to form a blend or a dispersion.

Preparation of Compositions Comprising the Isocyanate-Reactive Component

In general the additives may be added to the isocyanate-reactive materials to form a blend or a dispersion, preferably under vacuum.

Preparation of Precursor Coating Compositions and Coatings

In general, compositions comprising the isocyanate-reactive and isocyanate-functional components, along with the optional additives, are combined to form a coating precursor composition. Typically the ratios of isocyanate-reactive to isocyanate-functional components are chosen such that the molar ratio of isocyanate-groups of the isocyanate-functional material to isocyanate-reactive groups, typically hydroxyl groups, of the isocyanate-reactive material is about 1:1 to about 2:1. Typically the ratio is from about 1:1 to about 1.5:1 or from about 1:1 to about 1.2:1.

The coating composition (i.e. the reactive composition or coating precursor) typically has a viscosity at room temperature of from about 1000 to about 5000 mPas. This viscosity allows the material to be applied to the substrate for example by painting, brushing or spray coating, roller coating or coating using coating knives. The precursor composition is typically applied to the substrate and then allowed to cure forming a polyurethane-based polymer composition as the reaction product of the isocyanate-reactive and the isocyanate-functional components.

In a specific embodiment the coating composition is applied using a structured film. In this embodiment the reactive-composition is applied to the surface, typically the leading edge of a rotor blade, and is then (subsequently or simultaneously) distributed along the surface using the structured surface of a structured film. The structured film may be part of a coating tool for manual application or part of an automated process for example involving a coating robot. The structured film is made of a flexible material that allows the structured surface of the structured film to be bent around (and ideally following) the surface to be coated, which typically is the leading edge of a rotor blade and thus is a curved surface. The structured film may be (releasably) attached to the application device and can be replaced after use. The application device may contain a means suitable to bend the structured film around the curved surface to the coated and to maintain it in that position to provide contact of the structured surface of the film with the surface to be coated or with the coating composition on that surface. Such a means may include mechanical means, for example spring-driven mechanism or clamps, pneumatic, pressure-controlled, magnetic or electrical means. The connection may also be achieved by adhesion or using hook-and-loop mechanisms.

The structured film may also or additionally be attached to or be part of a foamed substrate providing sufficient buffering capacity to allow the structured film maintaining contact with the curved surface to be coated.

The structured surface of the structured film will be exposed to the reactive composition. The structure of this surface contains a pattern of raised and non-raised areas that allows an uninterrupted pathway of the reactive composition to flow from one edge of the structured surface to its other edge, typically the opposed edge. The structured surface is moved along the coating direction and the structured pattern is thus oriented to allow the flow of the reactive composition in that direction. The pattern can be generated by any suitable means and arrangements. Typically, the pattern may involve continuous grooves or a pattern of pins. The pattern may be symmetric or asymmetric. The pattern should provide a pathway that is wide enough for the coating composition to flow through but should allow the gaps created in the reactive coating composition by wiping the structured surface over the reactive composition to be refilled by the coating composition after the wiping movement has been completed. The depth of the pattern may be adjusted to the desired thickness of the coating. A coating thickness of between 150 and 350 µm can be achieved using a pattern having grooves of a depth of from at least about 300 µm, typically between 300 µm and 1500 µm. The grooves may have a width of from about 300 µm to about 1,500 µm. In case the pattern is created by an arrangement of knobs or pins, the depth and width of the grooves is replaced by the distance between the knobs or pin and their heights, respectively. While the structured film is desirably flexible such that it can be bent around a curved surface like a leading edge, it is not required that the structure surface of the film is made up of flexible materials. Structured films as described herein can be prepared by known methods in the art including but not limited to laser ablation, embossing and others. Materials made as described in WO 2012006207 to Hitschmann and Kuehneweg may also be used.

The structured films with the dimension described above may be applicable to provide smooth and homogeneous coatings for coating compositions having a typical viscosity of 1000 mPas to 5000 mPas like the precursor compositions described herein. By using the structured films the coating compositions may be applied to the rotor blades in a manual or an automated process.

Substrates

Typical substrates onto which the coating is applied or formed include polymeric resins, like fiber-reinforced polymeric resin. Typical substrates include but are not limited to rotor blades. Such rotor blades are preferably rotor blades for wind turbines, and preferably wind turbines of off-shore wind power plants but may also include rotor blades of aircrafts like helicopters. The coatings may be conveniently applied to rotor blades having a length (as their greatest dimension) of at least 30 m or at least 50 m or at least 90 m. Typically, the coating is applied to the leading edge of the rotor blade.

The coatings provided herein may also be used in combination with protective tapes, for example to smoothen the edge formed by a protective tape. In such applications the coatings may be referred to as "edge fillers". Edges, in particular from protective films or tapes applied to leading edges of rotor blades may be big enough to have a negative impact on the aerodynamics. Applying the coating to such edges may soften the edge formed by the tape and provide more favorable aerodynamics.

A thickness of from about 200 to about 500 μm of the coating may be sufficient to provide significant protection from erosion and/or icing or to improve the aerodynamic impact when used as edge filler.

The coatings provided herein are preferably used as top coats, that is the coatings are the outermost layer of the substrate, i.e. they are typically the outermost layer of the rotor blade.

The following list of examples and list of specific embodiments are provided to further illustrate the present disclosure. These lists are provided for illustrative purposes and are not intended to limit the disclosure to the examples and embodiments provided. A description detailing the methods referred to herein and used in the examples is also provided.

Percentages are percentages by weight with the sum of the ingredients amounting to 100% by weight unless specified otherwise.

Abbreviations

DBTL: dibutil tin dilaurate (Trigon Chemie GmbH, Germany)
DESMODUR E305: linear aliphatic NCO prepolymer based on hexamethylene diisocyanate, available from Bayer MaterialScience, Pittsburgh Pa., U.S.A.
DESMODUR N3300: hexamethylene diisocynate trimer, available from Bayer MaterialScience, Pittsburgh Pa., U.S.A.
Eq.-weight: equivalent weight.
POLYTHF1000: Polyetherdiol having a molecular weight of 1000 g/mol (BASF AG, Ludwigshafen Germany).
POLYTHF250: Polyetherdiol having a molecular weight of 250 g/mol (BASF AG, Ludwigshafen, Germany).
Test Methods
Viscosity:

Viscosity can be determined, unless specified otherwise, according to DIN EN ISO 2884 at 23° C. using a rheometric cone plate, C35/1° H, diameter 35 mm, measured on Haake Rheostress 600 at a shear rate of 100/s.
Elongation at Break and Tensile Strength at Break:

These parameters were determined according to ASTM D882-10 on a Zwickel tensile tester from Zwickel GmbH, Germany) using a head speed of 40 mm/s. Measurements were made on test samples prepared as described below
Irreversible Deformation (Permanent Set) E:

The irreversible deformation (permanent set) E was determined according to the equation:

$$E=100[L-L(0)]/L(0)$$

wherein E is the permanent set in percent, L is the length of the sample after a first elongation and relaxation circle and L(0) is the original length of the sample.
E is determined by subjecting an unstretched (original) test sample of a defined length (L(0)) to an elongation/relaxation cycle. In the elongation cycle the sample is stretched (elongated) to 300% of its original length (L(0)). Stretching is carried out as described above for determining the elongation at break and the tensile strength. The test sample is stretched to 300% of its original length at a speed of 40 m/s. Once the sample has reached 300% elongation the sample is kept at this elongation for 2 minutes. After holding the sample for 2 minutes the force is slowly released and the sample is relaxed at a speed of 40 m/s (i.e. using the same force in reverse order that was applied to elongate the sample). When the force is fully released the sample was held in that position for 2 minutes, after which the length (L) of the sample was determined. Samples according to the present disclosure do not relax to their original length but have a greater length after the elongation/relaxation cycle than their original length (a plot of force applied versus elongation shows a hysteresis curve). The length of the sample after the elongation/relaxation cycle is the length L.
Rain Erosion Test:

The rain erosion test (RET) was carried out as described in WO2010/122157 to Kallesoe and Nysteen on page 21 and FIGS. 1 and 2, incorporated herein by reference, with the difference that the coating samples were cured at room temperatures for 7 days. The rotor speed was 140 m/s (at the middle of the sample). Tip speed was 154 m/s and the root speed was 126 m/s.

The performance against rain erosion was determined by the length of the damaged area. The length of the damaged area is the length of the area where accumulated erosion damage can be visibly detected measured starting from the tip of the sample (the position where the sample has been subjected to the highest velocity) along the leading edge towards the other end of the sample.

EXAMPLES

Examples 1 to 3 and Comparative Examples 1 and 2

Preparation of Coating Compositions

The OH component (the isocyanate-reactive component) was prepared by mixing the ingredients in the amounts as indicated in the tables below. The composition containing the isocyanate-reactive component and the composition containing the isocyanate-functional component were fed separately into two cartridges that were connected to a mixing nozzle (2K injection system from Mixpac AG, Haag, Switzerland). The resulting reactive mixture (precursor coating composition) was applied onto a metal plate and evenly distributed on the plate using a coating knife to provide a film of a thickness of about 0.1 mm. The composition was either cured at room temperature for 7 days or in an oven at 70° C. for 120 minutes to provide a fully cured coating. Samples of defined site and shape were punched from the film by die-cutting. Test samples had a length of 50 mm, a width of 4 mm and a thickness between 0.09 and 0.12 mm and were used to determine the rheological properties (elongation, tensile strength and permanent set E). The results are shown in table 6.

TABLE 1

| Composition of Example 1 | | | | |
|---|---|---|---|---|
| OH-Component | MW | Eq. - weight | Weight [g] | eq1 |
| PolyTHF 1000 | 1000 | 497 | 15.64 | 0.006 |
| 1,4 butanediol | 90 | 45 | 6.67 | 0.030 |
| PolyTHF 250 | 250 | 125 | 3.98 | 0.006 |
| DBTL | | 0 | 1.00 | 0 |

TABLE 1-continued

Composition of Example 1

| NCO-Component | MW | Eq. - weight | weight | eq2 |
|---|---|---|---|---|
| Desmodur E305 | 984 | 328 | 72.71 | 0.044 |
| NCO/OH (eq2/eq1) | | | | 1.05 |
| Total weight (g) | | | 100 | |

TABLE 2

Composition of Example 2

| OH-Component | MW | Eq. - weight | weight | eq1 |
|---|---|---|---|---|
| PolyTHF 1000 | 1000 | 497 | 12.93 | 0.026 |
| PolyTHF 250 | 250 | 125 | 3.15 | 0.025 |
| DBTL | | 0 | 0.2 | 0 |
| 1,6 hexanediol | 118 | 59 | 10.09 | 0.17 |

| NCO-Component | MW | Eq. - weight | weight | eq2 |
|---|---|---|---|---|
| Desmodur E305 | 984 | 328 | 74.8 | 0.23 |
| NCO/OH (eq2/eq1) | | | | 1.03 |
| Total weight (g) | | | 101.17 | |

TABLE 3

Composition of Example 3

| OH-Component | MW | Eq. - weight | weight | eq1 |
|---|---|---|---|---|
| PolyTHF 1000 | 1000 | 497 | 19.5 | 0.039 |
| PolyTHF 250 | 250 | 125 | 4.0 | 0.032 |
| DBTL | | 0 | 0.4 | 0 |
| 1,4 butanediol | 90 | 45 | 5.7 | 0.127 |

| NCO-Component | MW | Eq.- weight | weight | eq2 |
|---|---|---|---|---|
| Desmodur E305 | 984 | 328 | 68.2 | 0.208 |
| NCO/OH (Eq.-weight 2/Eq.-weight 1) | | | | 1.051 |
| Total weight (g) | | | 97.8 | |

TABLE 4

Composition of Comparative Sample 1

| OH-Component | MW | Eq. - weight | weight | eq1 |
|---|---|---|---|---|
| PolyTHF 1000 | 1000 | 497 | 59.0 | 0.119 |
| DBTL | | 0 | 0.1 | 0 |

| NCO-Component | MW | Eq. - weight | weight | eq2 |
|---|---|---|---|---|
| Desmodur E305 | 984 | 328 | 40.9 | 0.125 |
| NCO/OH (eq2/eq1) | | | | 1.05 |
| Total weight (g) | | | 100 | |

TABLE 5

Composition of Comparative Sample 2

| OH-Part | MW | Eq- weight | weight | eq2 |
|---|---|---|---|---|
| TiO$_2$ | | | 114.24 | |
| PolyTHF 1000 | 1000 | 497 | 109.58 | 0.22 |
| PolyTHF 250 | 250 | 125 | 22.39 | 0.18 |

TABLE 5-continued

Composition of Comparative Sample 2

| | | | | |
|---|---|---|---|---|
| 1,4 butanediol | 90 | 45 | 27.02 | 0.60 |
| DBTL | | | 1.00 | |
| | | | 290.9 | 274.24 |

| NCO-Part | MW | eq-weight | weight | eq2 |
|---|---|---|---|---|
| Desmodur N3300 | 984 | 193 | 221.95 | 1.15 |

TABLE 6 mechanical properties of examples 1 to 3 and comparative examples 1 and 2

| Examples | Tensile strenght at break [N/mm$^2$] | Elongation at break [%] | Set E [%] |
|---|---|---|---|
| 1 | 35 | 677 | 18 |
| 2 | 53 | 537 | 20 |
| 3 | 35 | 677 | 20 |
| C1 | 6 | 677 | * |
| C2 | * | 63 | * |

* Not determined

As can be seen from the results in table 6 the use of a mixture of high and low molecular weight polyols leads to an increased tensile strength of the material while maintaining a very high elasticity (examples 1-3 versus comparative example 1). The use of a substantially linear difunctional prepolymer versus a non-linear trifunctional prepolymer maintains the very high elasticity of the coating (examples 1-3 versus comparative example 2).

Example 4

A material according to example 1 was subjected to a rain erosion test as described above. After exposure for 3 hours no erosion damage was detected by visible inspection. After 9 hours exposure there was only light erosion damage after visible inspection. The damaged area had a length of less than 1.0 cm. This finding can be contrasted with the results reported in WO2010/122157 for various polyesterpolyol-based polyurethane compositions where all compositions tested except one have been reported to show an erosion damage over a length of about 3 cm or more after exposure to the rain erosion test for 3 hours and area of damage of at least 6 cm length after 9 hour exposure to the rain erosion test.

List of Specific Embodiments

1. A reactive composition for making a polyurethane-based rain-erosion protective coating for rotor blades, the reactive composition comprising an isocyanate-reactive component and an isocyanate-functional component and wherein the isocyanate-reactive component comprises
    a first component i) being a short chain hydroxyl-functional compound having two terminal (α-ω) hydroxyl groups, a molecular weight of less than 250 g/mole and containing at least 2 carbon atoms, and
    a second component ii) comprising a high molecular weight hydroxyl-functional compound having two terminal (α-ω) hydroxyl groups and a molecular weight of at least 250 g/mol and comprising one or more units selected from oxyalkylene units and polyoxyalkylene units and wherein the isocyanate-functional component is an isocyanate prepolymer of the general formula NCO—Z—NCO, wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof.

2. The reactive composition of embodiment 1 wherein the component i) is selected from alkane diols, alkane ether diols, alkane polyether diols, alkane ester diols containing from about 3 to 12 carbon atoms.

3. The reactive composition according to any one of embodiments 1 or 2 wherein the component i) is an alkane diol.

4. The reactive composition according to any one of the preceding embodiments wherein the high molecular weight hydroxyl-functional compound comprises dihydroxyl-functional compounds selected from oxyalkylene diols and polyoxyalkylene diols having two terminal (α-ω) hydroxyl groups, a molecular weight of from at least about 250 g/mole up to about 10,000 g/mole.

5. The reactive composition according to any one of the preceding embodiments wherein the component ii) comprises a combination of α-ω dihydroxyl-functional compounds selected from oxyalkylene diols and polyoxyalkylene diols and said combination comprises a first fraction iia) of said diols having a molecular weight of from 250 g/mole up to about 600 g/mole and a second fraction iib) of said diols having a molecular weight of from about 800 g/mole up to about 5,000 g/mole.

6. The reactive composition according to any one of the preceding embodiments wherein component ii) comprises a combination of α-ω dihydroxyl-functional compounds selected from oxyalkylene diols and polyoxyalkylene diols and said combination comprises a first fraction iia) of said diols having a molecular weight of from 250 g/mole up to about 600 g/mole and a second fraction iib) of said diols having a molecular weight of from about 800 g/mole up to about 5,000 g/mole and wherein the diols according to the first fraction iia) are present in an amount of from about one tenth to about one third of the amount of the diols according to the second fraction iib) and wherein the amounts are based on weight.

7. The reactive composition according to any one of the preceding embodiments wherein component ii) comprises a combination of α-ω dihydroxyl-functional compounds selected from oxyalkylene diols and polyoxyalkylene diols and said combination comprises a first fraction iia) of said diols having a molecular weight of from 250 g/mole up to about 600 g/mole and a second fraction iib) of said diols having a molecular weight of from about 800 g/mole up to about 5,000 g/mole and wherein the diols according to the first fraction iia) are present in an amount of from about one tenth to about one third of the amount of the diols according to the second fraction iib) and wherein the diols according to the first component i) are present in an amount of from about one tenth to about one half of the amount of the diols according to the second fraction iib) and wherein the amounts are based on weight.

8. The reactive composition according to any one of the preceding embodiments wherein the isocyanate-functional component comprises urea-units that are the reaction product of a linear alkylene diisocyanate and a dihydroxyl-functionalized isocyanate-reactive compound.

9. The reactive composition according to any one of the preceding embodiments having a viscosity at room temperature (23° C.) of from about 1000 to about 5000 mPas (DIN EN ISO 2884).

10. The reactive composition according to any one of the preceding embodiments that is essentially free of pigments.

11. The reactive composition according to any one of the preceding embodiments having an elongation at break of greater than 300% and a tensile strength at break of at least 20 MPa after curing at room temperature (23° C.) for 7 days (168 h).

12. Use of the reactive composition according to any one of the preceding embodiments for making a protective coating to protect rotor blades from erosion, in particular rain erosion.

13. The use according to embodiment 12 wherein the rotor blade has a leading edge having a length of at least about 30 m, at least about 60 m or at least 130 m.

14. The use according to any one of embodiments 12 to 13 wherein the protective coating has an elongation at break of greater than 300% and a tensile strength at break of at least 20 MPa.

15. The use according to any one of embodiments 12 to 14 wherein the protective coating has an irreversible deformation (permanent set) E of more than about 10% and up to about 50% after a first elongation/relaxation cycle with the cycle involving an elongation to 300% and an elongation/relaxation speed of 40 mm/s.

16. The use according to any one of embodiments 12 to 15 wherein the protective coating is the outermost layer of at least a part of the external surface of the rotor blade.

17. The use according to any one of the embodiments 12 to 16 wherein the protective coating is transparent.

18. A rain-erosion protective coating on the external surface of a rotor blade, wherein the coating comprises the reaction product of a reactive composition according to any one of embodiments 1 to 11.

19. A rain-erosion protective coating on the external surface of a rotor blade, wherein the coating comprises the reaction product of a reactive composition comprising an isocyanate-reactive component and an isocyanate-functional component and wherein the isocyanate-reactive component comprises
   a first component i) being a short chain hydroxyl-functional compound having two terminal (α-ω) hydroxyl groups having a molecular weight of less than 250 g/mole and having at least 2 carbon atoms, and
   a second component ii) comprising a high molecular weight hydroxyl-functional compound having two terminal (α-ω hydroxyl groups and a molecular weight of at least 250 g/mol and comprising one or more units selected from oxyalkylene units and polyoxyalkylene units,
and wherein the isocyanate-functional component is an isocyanate prepolymer of the general formula NCO—Z—NCO, wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof.

20. The rain-erosion protective coating according to any one of embodiment 19 having an elongation at break of greater than 300% and a tensile strength at break of at least about 20 MPa.

21. The rain erosion coating according to any one of embodiments 19 or 20 having an irreversible deformation (permanent set) E of more than about 10% and up to about 50% after a first elongation/relaxation cycle with the cycle involving an elongation to 300%.

22. The protective coating according to any one of embodiments 19 to 21 wherein the component i) is selected from alkane diols, alkane ether diols, alkane polyether diols, alkane ester diols containing from about 3 to 12 carbon atoms.

23. The protective coating according to any one of embodiments 19 to 22 wherein the high molecular weight hydroxyl-functional compound comprises dihydroxyl-functional compounds selected from oxyalkylene diols and polyoxyalkylene diols having two terminal (α-ω) hydroxyl groups, a molecular weight of from at least about 250 g/mole up to about 10,000 g/mole.

24. The protective coating according to any one of embodiments 19 to 23 wherein component ii) comprises a combination of α-ω dihydroxyl-functional compounds selected from oxyalkylene diols and polyoxyalkylene diols and said combination comprises
a first fraction iia) of said diols having a molecular weight of from 250 g/mole up to about 600 g/mole and a second fraction iib) of said diols having a molecular weight of from about 800 g/mole up to about 5,000 g/mole.

25. The protective coating according to any one embodiments 19 to 24 wherein component ii) comprises a combination of α-ω dihydroxyl-functional compounds selected from oxyalkylene diols and polyoxyalkylene diols and said combination comprises a first fraction iia) of said diols having a molecular weight of from 250 g/mole up to about 600 g/mole and a second fraction iib) of said diols having a molecular weight of from about 800 g/mole up to about 5,000 g/mole and wherein the diols according to the first fraction iia) are present in an amount of from about one tenth to about one third of the amount of the diols according to the second fraction iib) and wherein the amounts are based on weight.

26. The protective coating according to any one of embodiments 19 to 25 wherein component ii) comprises a combination of α-ω dihydroxyl-functional compounds selected from oxyalkylene diols and polyoxyalkylene diols and said combination comprises
a first fraction iia) of said diols having a molecular weight of from 250 g/mole up to about 600 g/mole and a second fraction iib) of said diols having a molecular weight of from about 800 g/mole up to about 5,000 g/mole and wherein the diols according to the first fraction iia) are present in an amount of from about one tenth to about one third of the amount of the diols according to the second fraction iib) and wherein the amounts are based on weight, and wherein the diols according to the first component are present in an amount of from about one tenth to about one half of the amount of the diols according to the second fraction iib) and wherein the amounts are based on weight.

27. The protective coating according to any of embodiments 19 to 26 wherein the isocyanate-functional component comprises urea-units that are the reaction product of a linear alkylene diisocyanate and a dihydroxyl-functionalized isocyanate-reactive compound.

28. The protective coating according to any one of embodiments 19 to 27 wherein the article is a rotor blade wherein the leading edge of the rotor blade has a length of at least about 30 m.

29. The protective coating according to any one of embodiments 19 to 28 wherein the protective coating is the outermost layer of at least a part of the external surface of the rotor blade.

30. The protective coating according to any one of embodiments 19 to 29 being transparent.

31. Method for protecting the external surface of a rotor blade from erosion, in particular rain erosion, comprising applying the reactive composition according to any one of embodiments 1 to 11 to the external surface of a rotor blade and subjecting the reactive composition to curing to form a polyurethane-based coating.

32. The method of embodiment 31 wherein the polyurethane-based coating is a coating according to any of embodiments 19 to 29.

33. Method for applying a reactive composition for making a protective coating on a curved surface of an article said method comprising applying the reactive composition on the surface using a structured sheet wherein the sheet is structured to provide a continuous path through which the composition can be distributed onto the surface and wherein the sheet is bent around the curved surface and moved along the curved surface.

34. The method of embodiment 33, wherein the reactive composition is according to any one of embodiments 1 to 11.

35. A device for applying a coatable substance onto a curved surface the device comprising a structured sheet wherein the sheet is structured to provide a continuous path through which the coatable substance can be distributed onto the surface and wherein the sheet is bent to fit around the curved surface to be coated.

36. The method of embodiment 35, wherein the reactive composition is according to any one of embodiments 1 to 11.

The invention claimed is:

1. A reactive composition for making a polyurethane-based rain-erosion protective coating for rotor blades, the reactive composition comprising an isocyanate-reactive component and an isocyanate-functional component,
wherein the isocyanate-reactive component comprises:
a first component i) being a short chain hydroxyl-functional compound having two terminal (α-ω) hydroxyl groups, a molecular weight of less than 250 g/mole and containing at least 2 carbon atoms and
a second component ii) comprising a high molecular weight hydroxyl-functional compound having two terminal (α-ω) hydroxyl groups and a molecular weight of at least 250 g/mol and comprising one or more units selected from oxyalkylene units and polyoxyalkylene units
wherein the isocyanate-functional component is an isocyanate prepolymer of the general formula NCO—Z—NCO,
wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof,
wherein component ii) comprises a combination of α-ω dihydroxyl-functional compounds selected from oxyalkylene diols and polyoxyalkylene diols and said combination comprises
a first fraction iia) of said diols having a molecular weight of from 250 g/mole up to about 600 g/mole and
a second fraction iib) of said diols having a molecular weight of from about 800 g/mole up to about 5,000 g/mole and
wherein the diols according to the first fraction iia) are present in an amount of from about one tenth to about one third of the amount of the diols according to the second fraction iib), wherein the amounts are based on weight, and
wherein the diols according to the first component i) are present in an amount of from about one tenth to about one half of the amount of the diols according to the second fraction iib), wherein the amounts are based on weight, and wherein the reactive composition, when cured at 23° C. for 168 hours, has an elongation at break of at least 300%, a tensile strength of at least 20 MPa, and an irreversible deformation (permanent set) E from about 10% to about 50% after a first elongation/relaxation cycle with the cycle involving an elongation to 300%.

2. The reactive composition of claim 1 wherein the component i) is selected from alkane diols, alkane ether diols, alkane polyether diols, alkane ester diols containing from about 3 to 12 carbon atoms.

3. The reactive composition of claim 1 wherein the high molecular weight hydroxyl-functional compound comprises dihydroxyl-functional compounds selected from oxyalkylene diols and polyoxyalkylene diols having two terminal (α-ω) hydroxyl groups, a molecular weight of from at least about 250 g/mole up to about 10,000 g/mole.

4. The reactive composition of claim 1 having a viscosity at room temperature (23° C.) of from about 1000 to about 5000 mPas (DIN EN ISO 2884).

5. A rain-erosion protective coating on the external surface of a rotor blade, wherein the coating comprises the reaction product of a reactive composition comprising an isocyanate-reactive component and an isocyanate-functional component and
wherein the isocyanate-reactive component comprises
  a first component i) being a short chain hydroxyl-functional compound having two terminal (α-ω) hydroxyl groups having a molecular weight of less than 250 g/mole and having at least 2 carbon atoms, and
  a second component ii) comprising a high molecular weight hydroxyl-functional compound having two terminal (α-ω hydroxyl groups and a molecular weight of at least 250 g/mol and comprising one or more units selected from oxyalkylene units and polyoxyalkylene units,
wherein the isocyanate-functional component is an isocyanate prepolymer of the general formula NCO—Z—NCO,
  wherein Z is a linking group comprising at least two urethane (—NH—CO—O—) units and additionally one or more units selected from alkylenes, oxyalkylenes, polyoxyalkylenes, alkylene esters, oxyalkylene esters, polyoxyalkylene esters and combinations thereof,
wherein component ii) comprises a combination of α-ω dihydroxyl-functional compounds selected from oxyalkylene diols and polyoxyalkylene diols and said combination comprises
  a first fraction iia) of said diols having a molecular weight of from 250 g/mole up to about 600 g/mole and
  a second fraction iib) of said diols having a molecular weight of from about 800 g/mole up to about 5,000 g/mole and
  wherein the diols according to the first fraction iia) are present in an amount of from about one tenth to about one third of the amount of the diols according to the second fraction iib), wherein the amounts are based on weight, and
  wherein the diols according to the first component are present in an amount of from about one tenth to about one half of the amount of the diols according to the second fraction iib), wherein the amounts are based on weight, and
wherein the coating has an elongation at break of at least 300%, a tensile strength of at least 20 MPa, and an irreversible deformation (permanent set) E from about 10% to about 50% after a first elongation/relaxation cycle with the cycle involving an elongation to 300%.

6. The protective coating according to claim 5 wherein the component i) is selected from alkane diols, alkane ether diols, alkane polyether diols, alkane ester diols containing from about 3 to 12 carbon atoms.

7. The protective coating according to claim 5 wherein the high molecular weight hydroxyl-functional compound comprises dihydroxyl-functional compounds selected from oxyalkylene diols and polyoxyalkylene diols having two terminal (α-ω) hydroxyl groups, a molecular weight of from at least about 250 g/mole up to about 10,000 g/mole.

8. The protective coating of claim 5 wherein the article is a rotor blade wherein the leading edge of the rotor blade has a length of at least about 30 m.

9. The protective coating of claim 5 wherein the protective coating is the outermost layer of at least a part of the external surface of the rotor blade.

* * * * *